United States Patent
Davidson

(10) Patent No.: US 9,737,849 B2
(45) Date of Patent: Aug. 22, 2017

(54) CLEANING STACK GAS

(71) Applicant: 3 D CLEAN COAL EMISSIONS STACK, LLC, Powell, OH (US)

(72) Inventor: James Gary Davidson, Buchanan, TN (US)

(73) Assignee: 3 D Clean Coal Emissions Stack, LLC, Powell, OH (US)

( * ) Notice: Subject to any disclaimer, the term of this patent is extended or adjusted under 35 U.S.C. 154(b) by 260 days.

(21) Appl. No.: 14/722,244

(22) Filed: May 27, 2015

(65) Prior Publication Data

US 2015/0258493 A1    Sep. 17, 2015

Related U.S. Application Data

(63) Continuation of application No. 14/214,247, filed on Mar. 14, 2014, now Pat. No. 9,067,837, and a
(Continued)

(51) Int. Cl.
*B01D 53/86* (2006.01)
*C05C 5/00* (2006.01)
(Continued)

(52) U.S. Cl.
CPC ....... *B01D 53/8609* (2013.01); *B01D 53/864* (2013.01); *B01D 53/869* (2013.01);
(Continued)

(58) Field of Classification Search
CPC ............ B01D 53/8609; B01D 53/8643; B01D 53/8631; B01D 53/8637; B01D 53/8693;
(Continued)

(56) References Cited

U.S. PATENT DOCUMENTS 3,895,094 A    7/1975    Carter et al.
4,052,337 A    10/1977   Nishikawa et al.
(Continued)

FOREIGN PATENT DOCUMENTS

DE    4443301    6/1996
EP    0393917    10/1990
(Continued)

OTHER PUBLICATIONS

Translation of DE4443301 obtained from Espacenet on Mar. 31, 2017.*

*Primary Examiner* — Jill Warden
*Assistant Examiner* — Matthew Krcha
(74) *Attorney, Agent, or Firm* — Hahn Loeser & Parks, LLP

(57) ABSTRACT

A method and apparatus for cleaning and recycling stack gas from coal-fired power plants, from natural or propane burning heating plants, or from cement kilns by using renewable catalysts of zeolite to separate pollutants into recyclable and reusable materials. The method reduces from the stack gas carbon monoxide (CO), carbon dioxide ($CO_2$), nitrogen oxide (NOx), sulfur oxide (SOx) as well as halogens such as chloride and fluorides and trace metals particularly, mercury, lead, and zinc. The method and apparatus also result in production of fertilizer products by purging with gaseous or liquid nitrogen the zeolite beds through which the stack gas flows. The oxygen generated may be recycled to the burners in the plant.

11 Claims, 9 Drawing Sheets

Related U.S. Application Data continuation-in-part of application No. 13/841,339, filed on Mar. 15, 2013, now Pat. No. 8,821,818.

(51) Int. Cl.
  *B01D 53/88* (2006.01)
  *F23J 15/02* (2006.01)
  *C05D 9/00* (2006.01)

(52) U.S. Cl.
  CPC ..... *B01D 53/8631* (2013.01); *B01D 53/8637* (2013.01); *B01D 53/8643* (2013.01); *B01D 53/8665* (2013.01); *B01D 53/8671* (2013.01); *B01D 53/8693* (2013.01); *B01D 53/885* (2013.01); *C05C 5/00* (2013.01); *C05D 9/00* (2013.01); *F23J 15/02* (2013.01); *B01D 2255/50* (2013.01); *B01D 2257/302* (2013.01); *B01D 2257/404* (2013.01); *B01D 2257/50* (2013.01); *B01D 2257/502* (2013.01); *B01D 2257/504* (2013.01); *B01D 2257/602* (2013.01); *B01D 2258/0283* (2013.01); *F23J 2219/10* (2013.01); *Y02C 20/10* (2013.01); *Y02E 20/326* (2013.01); *Y02P 20/152* (2015.11)

(58) Field of Classification Search
  CPC .............. B01D 53/885; B01D 53/8665; B01D 53/8671; B01D 53/869; B01D 53/864
  See application file for complete search history.

(56) References Cited

U.S. PATENT DOCUMENTS

| | | | |
|---|---|---|---|
| 4,133,671 A | 1/1979 | Mikel | |
| 4,297,328 A | 10/1981 | Ritscher et al. | |
| 4,735,930 A | 4/1988 | Gerdes et al. | |
| 4,748,012 A | 5/1988 | Weber et al. | |
| 4,946,659 A | 8/1990 | Held et al. | |
| 5,041,270 A | 8/1991 | Fujitani et al. | |
| 5,041,272 A | 8/1991 | Tamura et al. | |
| 5,085,840 A | 2/1992 | Held et al. | |
| 5,143,707 A | 9/1992 | Beck et al. | |
| 5,160,033 A | 11/1992 | Vassilakis et al. | |
| 5,186,903 A | 2/1993 | Cornwell | |
| 5,223,237 A | 6/1993 | Simpson et al. | |
| 5,270,024 A | 12/1993 | Kasahara et al. | |
| 5,417,949 A | 5/1995 | McWilliams et al. | |
| 5,417,950 A | 5/1995 | Sheu et al. | |
| 5,429,842 A | 7/1995 | Appel et al. | |
| 5,482,692 A | 1/1996 | Audeh et al. | |
| 5,520,895 A | 5/1996 | Sharma et al. | |
| 5,529,610 A * | 6/1996 | Watson | B01D 53/02 95/100 |
| 5,536,483 A | 7/1996 | Descat et al. | |
| 5,589,147 A | 12/1996 | Farnos et al. | |
| 5,629,842 A | 5/1997 | Johnson et al. | |
| 5,631,818 A | 5/1997 | Johnson et al. | |
| 5,740,024 A | 4/1998 | Johnson et al. | |
| 5,776,324 A | 7/1998 | Usala | |
| 5,871,703 A | 2/1999 | Alix et al. | |
| 5,903,450 A | 5/1999 | Johnson et al. | |
| 5,906,743 A * | 5/1999 | Cohen | A23F 5/223 210/502.1 |
| 5,920,474 A | 7/1999 | Johnson et al. | |
| 6,117,403 A | 9/2000 | Alix et al. | |
| 6,132,692 A | 10/2000 | Alix et al. | |
| 6,171,556 B1 | 1/2001 | Burk et al. | |
| 6,221,324 B1 | 4/2001 | Coq et al. | |
| 6,350,298 B1 * | 2/2002 | Su | B01D 53/02 95/129 |
| 6,605,263 B2 | 8/2003 | Alix et al. | |
| 6,638,342 B2 | 10/2003 | Gansley et al. | |
| 6,689,709 B1 | 2/2004 | Tran et al. | |
| 6,914,026 B2 | 7/2005 | Tran et al. | |
| 6,936,231 B2 | 8/2005 | Duncan et al. | |
| 6,991,771 B2 | 1/2006 | Duncan et al. | |
| 7,048,899 B2 | 5/2006 | Alix et al. | |
| 7,052,662 B2 | 5/2006 | Duncan et al. | |
| 7,118,722 B2 | 10/2006 | Tran et al. | |
| 7,399,453 B2 | 7/2008 | Kelley et al. | |
| 7,404,940 B2 | 7/2008 | Higgins et al. | |
| 7,704,475 B2 | 4/2010 | Bull et al. | |
| 7,968,068 B2 | 6/2011 | Bull et al. | |
| 8,071,043 B2 | 12/2011 | Como et al. | |
| 8,092,270 B2 | 1/2012 | Sterndale et al. | |
| 8,821,818 B1 | 9/2014 | Davidson | |
| 2001/0014304 A1 | 8/2001 | Satokawa et al. | |
| 2004/0053773 A1 | 3/2004 | Sarkar et al. | |
| 2004/0109805 A1 | 6/2004 | Schweter et al. | |
| 2005/0178303 A1 | 8/2005 | Higgins | |
| 2005/0260114 A1 | 11/2005 | Higgins et al. | |
| 2007/0157690 A1 | 7/2007 | Chen et al. | |
| 2008/0044331 A1 | 2/2008 | Schweter et al. | |
| 2010/0083828 A1 | 4/2010 | Duncan et al. | |
| 2010/0089110 A1 | 4/2010 | Duncan et al. | |
| 2010/0319542 A1 | 12/2010 | Alix et al. | |
| 2011/0052453 A1 | 3/2011 | McLarnon et al. | |
| 2011/0110841 A1 | 5/2011 | Mahoney et al. | |
| 2011/0125326 A1 | 5/2011 | Bosco et al. | |
| 2013/0269525 A1 | 10/2013 | Alix et al. | |

FOREIGN PATENT DOCUMENTS

| | | |
|---|---|---|
| GB | 2051030 | 1/1981 |
| WO | 2004002611 | 1/2004 |
| WO | 2004047960 | 6/2004 |

* cited by examiner

CLEANING STACK GAS

RELATED APPLICATIONS

This application is a continuation of U.S. patent application Ser. No. 14/214,247, filed on Mar. 14, 2014, which is a continuation-in-part of and claims priority to U.S. Pat. No. 8,821,818, filed on Mar. 15, 2013.

BACKGROUND AND SUMMARY

This invention relates cleaning of stack gases such as those from coal fired power plants, from natural or propane burning heating plants, or from cement kilns. The stack gases exhausted from each such facility is controlled by environmental regulations. Such regulations require abatement of carbon monoxide (CO), carbon dioxide ($CO_2$), nitrogen oxide (NOx), sulfur oxide (SOx); as well as abatement of halogens, such as chloride and fluorides, and trace metals, particularly mercury, lead, and zinc.

Various methods and apparatus have been proposed for abating these pollutants in stack gases. In particular, a variety of methods have been proposed for reducing pollutants released from coal-fired stack gas. One method for cleaning coal-fired stack gas is the use of scrubbers that inject a liquid or slurry into a gas stream that washes various pollutants, such as acidic compounds, from the exhaust stream. Another method for cleaning coal-fired stack gas is the use of an exhaust burner that combusts volatile materials and other compounds reducing pollution in the stack gas.

Specifically, it has been proposed that the stack gases be mixed with ammonia or urea and then passed through a catalyst in which the ammonia reacts selectively with the nitrous oxides to form nitrogen gas in water vapor, or combustion of a sulfur-containing fossil fuel in the presence of a calcium carbonate or magnesium carbonate to form calcium sulfate or magnesium sulfate. See U.S. Pat. Nos. 8,181,451; 6,706,246; 5,525,317; 5,237,939; 4,185,080; and 4,051,225. It has also been proposed reducing nitrogen in stack gas by passing the stack gas through a heat exchange having a SCR catalyst. See U.S. Pat. No. 5,918,555. Likewise, it has been proposed reducing sulfur oxide content in stack gases by catalyzed oxidation to sulfur trioxide in the presence of an absorbent or combusting sulfur-containing fuel in a combustion zone charged with a slurry in sulfuric acid solution. See U.S. Pat. Nos. 5,540,755; 4,649,034; 4,284,015; and 4,185,080.

It has also been proposed catalytically converting unburned hydrocarbons and carbon monoxide to carbon dioxide and reducing nitrogen oxides to nitrogen subsequent to the combustion of fossil fuels while absorbing sulfur oxide, where the catalytic material is physically combined onto a dry powder of an adsorbent matrix select from calcium aluminate, calcium aluminate cement, barium titanate, and calcium titanate. See U.S. Pat. No. 4,483,259. Similarly, it has been proposed to pass the stack gases through a catalyst bed of a combination of active metals on the surface that is capable of reducing or converting sulfur oxides, carbon monoxide and hydra carbons to inert compounds such as carbon dioxide, water and nitrogen. See U.S. Pat. No. 7,399,458. Levels of mercury in stack gases from coal combustion have also been reduced by introducing a sorbent composition into the gas stream in a zone where temperature is greater than 500° C. and where the sorbent composition comprises an effective amount of nitrate salt and/or a nitrite salt. See U.S. Pat. Nos. 7,468,170 and 7,731,781.

However, these previous proposals have a number of drawbacks. Many require addition of another gas such as ammonia sulfuric acid, or the presence of an active metal catalyst. One particular problem unresolved by current technology is carbon gaseous pollutants that cannot be reduced by scrubbing, combustion, or capture. It has been proposed to capture the carbon in the form of carbon dioxide, compress the carbon dioxide, and storing it in a geological formation. Zeolite has been proposed among others as a material to absorb carbon dioxide, and after sequestering the carbon dioxide then to be able to regenerate the zeolite material. See "Carbon Dioxide Capture Using a Zeolite Molecular Sieve Sampling System for Isotopic Studies ($^{13}C$ and $^{14}C$) of Respiration", Radiocarbon, 47, 441-451 (2005); "Absorbent Materials for Carbon Dioxide Capture from Large Anthropogenic Point Sources", ChemSusChem 2009, 2, 796-854; "NIST Provides Octagonal Window of Opportunity for Carbon Capture", NIST Techbeat, Feb. 7, 2012. However, these uses of zeolite involved large particle sizes of zeolite; for example, between 1/16 and 1/8 inch in size under conditions to provide for adsorption of carbon dioxide and later regeneration. These methods of absorbing carbon dioxide highlight the continuing problem of disposing of the sequestered carbon dioxide.

There is therefore still a need for a method and apparatus to effectively remove carbon monoxide, carbon dioxide, nitrous oxides, sulfur oxides and trace metals, such as mercury, from stack gases without consuming expensive catalysts, without injecting additional gases and solids into the stack gas, and without creating waste products that, themselves, present problems in disposal. This is of particular concern in cleaning of coal-fired stack gas from fire power plants because of the release of volatiles such as coal tar and other active pollutants along with carbon dioxide in the stack gas.

Presently disclosed is a method of cleaning stack gases comprising the steps of:

(a) providing in a stack adapted to pass stack gases through a first catalytic flow-through bed of calcium zeolite comprising natural zeolite particles of a majority between 44 µm and 64 µm in size at a temperature above the dew point between 125 and 500° F. and a pressure between 3 and 200 psi adapted to reduce carbon oxides in the stack gases;

(b) providing in the stack adapted to pass stack gases positioned adjacent the first catalytic flow-through bed, a second catalytic flow-through bed of a blend between 25 and 75% of sodium zeolite and calcium zeolite comprising natural sodium and calcium zeolite particles of a majority between 65 µm and 125 µm in size at a temperature above the dew point between 125 and 500° F. and a pressure between 3 and 200 psi adapted to reduce nitrogen oxides in the stack gases;

(c) providing in the stack adapted to pass stack gases positioned adjacent the second catalytic flow-through bed, a third catalytic flow-through bed of calcium zeolite comprising natural zeolite particles of a majority between 78 m and 204 m at a temperature above the dew point between 125 and 500° F. and a pressure between 3 and 200 psi adapted to reduce sulfur oxides in the stack gases; and (d) passing stack gases selected from the group consisting of volatiles from combustion of coal or from combustion of natural gas or from a cement kiln sequential through the first catalytic bed, the second catalytic bed, and the third catalytic bed each collecting materials in the catalytic beds and providing gas exiting the third catalytic bed with at least 70% reduction in sulfur oxides, nitrogen oxides and carbon oxide.

The method where the stack gas is sequentially circulated through the first catalytic bed, the second catalytic bed, and the third catalytic bed may also involve removal from the stack gas of at least 50% or 70% of mercury in all forms.

Also disclosed is a method of cleaning stack gases comprising the steps of:
 (a) providing in a stack adapted to pass stack gases through a first catalytic flow-through bed of calcium zeolite comprising natural zeolite particles of a majority between 44 μm and 64 μm in size at a temperature above the dew point between 125 and 500° F. and a pressure between 3 and 200 psi adapted to reduce carbon oxides in the stack gases;
 (b) providing in the stack adapted to pass stack gases positioned adjacent the first catalytic flow-through bed, a second catalytic flow-through bed of a blend between 25 and 75% of sodium zeolite and calcium zeolite comprising natural sodium and calcium zeolite particles of a majority between 65 μm and 125 μm in size at a temperature above the dew point between 125 and 500° F. and a pressure between 3 and 200 psi adapted to reduce nitrogen oxides in the stack gases;
 (c) providing in the stack adapted to pass stack gases positioned adjacent the second catalytic flow-through bed, a third catalytic flow-through bed of calcium zeolite comprising natural zeolite particles of a majority between 78 μm and 204 μm at a temperature above the dew point between 125 and 500° F. and a pressure between 3 and 200 psi adapted to reduce sulfur oxides in the stack gases;
 (d) passing stack gases selected from the group consisting of volatiles from combustion of coal or from combustion of natural gas or from a cement kiln sequential through the first catalytic bed, the second catalytic bed, and the third catalytic bed each collecting materials in the catalytic beds and providing gas exiting the third catalytic bed with at least 70% reduction in sulfur oxides, nitrogen oxides and carbon oxide; and
 (e) purging solids and liquids from the first catalytic bed, the second catalytic bed, and the third catalytic bed by intermittently passing nitrogen through the beds to remove solids and liquids collected from the stack gases by the beds.

Again, the method where the stack gas is sequentially circulated through the first catalytic bed, the second catalytic bed, and the third catalytic bed may also involve removal from the stack gas of at least 50% or 70% of mercury in all forms.

In any case, the method may also comprise in addition a fourth catalytic flow-through bed of calcium zeolite comprising natural zeolite particles between 44 μm and 64 μm in size positioned in the stack before the first catalytic bed with an electrical charge on said fourth catalytic flow-through bed. The fourth catalytic flow-through bed serves to separately collect bauxite compounds from the stack gases before passing through the first catalytic bed.

In any event, the method may also involve the gases exiting a stack from the third catalytic bed, whether or not a fourth catalytic flow-through bed is used, with at least 90% or 95% reduction in bauxite compounds, sulfur oxides, nitrogen oxides, mercury oxide, and carbon oxide compared to the stack gases delivered through the stack.

In any event, the method may involve where the stack gas is circulated through the first catalytic bed, the second catalytic bed, and the third catalytic bed, each positioned between screens of between 150 and 250 mesh. In addition or alternatively, the first catalytic bed, the second catalytic bed, and the third catalytic bed may each be provided on a moving disk. The method may alternatively involve at least two series of sequential circulations through the first catalytic bed, the second catalytic bed, and the third catalytic bed provided in parallel so that the stack gases can be cleaned by the method through one series of beds while other series of the beds can be cleaned as described below.

The method may alternatively be practiced separately to reduce carbon monoxide and dioxide, sulfur oxides and/or nitrogen dioxides. This is particularly the case with stack gas from cement kilns and other plants, which tend to focus on carbon dioxide.

Also disclosed is an alternative method of cleaning stack gases comprising the steps of:
 (a) providing in a stack adapted to pass stack gases of less than 7% oxygen through a first catalytic flow-through bed of calcium zeolite comprising natural zeolite particles at a temperature above the dew point between 125 and 500° F. and a pressure between 3 and 200 psi adapted to reduce carbon oxides from the stack gases and increase oxygen levels in the stack gas;
 (b) providing in the stack adapted to pass stack gases positioned adjacent the first catalytic flow-through bed, a second catalytic flow-through bed of a blend between 25 and 75% of sodium zeolite and calcium zeolite comprising natural sodium and calcium zeolite particles at a temperature above the dew point between 125 and 500° F. and a pressure between 3 and 200 psi adapted to reduce nitrogen oxides from the stack gases and increase oxygen levels in the stack gas;
 (c) providing in the stack adapted to pass stack gases positioned adjacent the second catalytic flow-through bed, a third catalytic flow-through bed of calcium zeolite comprising natural zeolite particles at a temperature above the dew point between 125 and 500° F. and a pressure between 3 and 200 psi adapted to reduce sulfur oxides in the stack gases and increase oxygen levels in the stack gas; and
 (d) passing stack gases of less than 7% oxygen selected from the group consisting of volatiles from combustion of coal or from combustion of natural gas or from a cement kiln sequential through the first catalytic bed, the second catalytic bed, and the third catalytic bed each collecting materials catalytic beds and providing gas exiting the third catalytic bed with at least 70% reduction in sulfur oxides, nitrogen oxides and carbon oxide and greater than 15% oxygen.

In this alternative method, the beds providing the first catalytic bed, the second catalytic bed, and the third catalytic bed may also involve the removal from the stack gas of at least 50% or 70% of mercury. The oxygen exiting the third catalytic bed may be recirculated through the burners to provide fuel for the combustible system.

In any case, the alternative method may also comprise in addition a fourth catalytic flow-through bed of calcium zeolite comprising natural zeolite particles between 44 μm and 64 μm in size positioned in the stack before the first catalytic bed with an electrical charge on said fourth catalytic flow-through bed to collect bauxite compounds from the stack gases before passing through the first catalytic bed.

In any event, the alternative method may also involve the gases exiting a stack from the third catalytic bed, whether or not a fourth catalytic flow is used, providing at least 90% or 95% reduction in bauxite compounds, sulfur oxides, nitrogen oxides, mercury oxide, and carbon oxides compared to the stack gases delivered through the stack.

In any event, the alternative method may involve where the stack gas is circulated through the first catalytic bed, the second catalytic bed, and the third catalytic bed, each positioned between screens of between 150 and 250 mesh. In addition or alternatively, the first catalytic bed, the second catalytic bed, and the third catalytic bed may each be provided on a moving disk. The method may alternatively involve at least two series of sequential circulations through the first catalytic bed, the second catalytic bed, and the third catalytic bed provided in parallel so stack gas can be cleaned by the method through one series of beds while other series of the beds can be purged as described below.

The alternative method may be practiced separately to reduce carbon monoxide and dioxide, sulfur oxides and/or nitrogen dioxides.

Also disclosed is an apparatus for cleaning stack gases comprising:
- (a) a first catalytic flow-through bed of natural calcium zeolite with a porosity of a total surface area of not greater than 1200 $m^2/g$ adapted to reduce sulfur oxides positioned in an exhaust stack;
- (b) a second catalytic flow-through bed of a blend of natural sodium zeolite and natural calcium zeolite of a porosity with a total surface area of not greater than 1200 $m^2/g$ adapted to reduce nitrogen oxides positioned in the exhaust stack above the first bed;
- (c) a third catalytic flow-through bed of natural calcium zeolite with a porosity of a total surface area not greater than 1200 $m^2/g$ adapted to reduce carbon oxides and mercury oxides positioned in the exhaust stack above the second bed; and
- (d) the exhaust stack adapted to provide a gas flow selected from the group consisting of volatiles from combustion of coal or combustion of natural gas sequential through the first catalytic bed, the second catalytic bed, and the third catalytic bed each collecting solids in the catalytic beds and providing gas exiting the third catalytic bed with at least 70 or 90% reduction in sulfur oxides, nitrogen oxides, and carbon oxide.

In the apparatus, the blend of natural sodium zeolite and natural calcium zeolite in the second catalytic bed may be between 25 and 75%. The apparatus having the first catalytic bed, the second catalytic bed, and the third catalytic bed may have provided between each bed on moving disks. Further, the first catalytic bed, the second catalytic bed, and the third catalytic bed may also have moving disks such that the stack gases in element (d) can be continually passed through the first catalytic bed, the second catalytic bed, and the third catalytic bed to provide collection of solids and/or liquids while other portions or beds of like compositions are purged with nitrogen to collect the solids and/or liquids from the beds. The apparatus may also be provided in the addition or in the alternative with first catalytic bed, second catalytic bed, and third catalytic bed adapted to be purged with gas or liquid nitrogen to collect the solids and/or liquids from the beds.

The apparatus may also be provided with a fourth catalytic flow-through bed positioned in the exhaust gases before the first catalytic bed with a porosity of a total surface area not greater than 1200 $m^2/g$ adapted to collect bauxite compounds before passage through the first catalytic bed. Alternatively, the first catalytic bed, the second catalytic bed, and the third catalytic bed each have a porosity of a total surface area not greater than 800 $m^2/g$ and the fourth catalytic flow, if used, may have a porosity of a total surface area not greater than 800 $m^2/g$.

In any event, the apparatus may also provide the gases exiting a stack from the third catalytic bed, whether or not a fourth catalytic flow is used, with at least 90% or 95% reduction in bauxite compounds, sulfur oxides, nitrogen oxides, mercury oxide, and carbon oxides compared to the stack gases delivered through the stack. In the case of cement kilns, the focus is on the reduction of carbon dioxide.

Also disclosed is an apparatus for cleaning stack gases comprising:
- (a) a first catalytic flow-through bed of natural calcium zeolite with a porosity of a total surface area of not greater than 1200 $m^2/g$ adapted to reduce sulfur oxides positioned in an exhaust stack;
- (b) a second catalytic flow-through bed of a blend of natural sodium zeolite and natural calcium zeolite of a porosity with a total surface area of not greater than 1200 $m^2/g$ adapted to reduce nitrogen oxides positioned in the exhaust stack above the first bed;
- (c) a third catalytic flow-through bed of natural calcium zeolite with a porosity of a total surface area not greater than 1200 $m^2/g$ adapted to reduce carbon oxides and mercury oxides positioned in the exhaust stack above the second bed;
- (d) the exhaust stack adapted to provide a gas flow selected from the group consisting of volatiles from combustion of coal or combustion of natural gas or from a cement kiln sequential through the first catalytic flow-through bed, the second catalytic flow-through bed, and the third catalytic flow-through bed each catalytic bed collecting solids and providing stack gases exiting the third catalytic flow-through bed with at least 70% reduction in sulfur oxides, nitrogen oxides, and carbon oxide; and
- (e) the first catalytic flow-through bed, the second catalytic flow-through bed, and the third catalytic flow-through bed are each provided on rotating disks such that the stack gases can be continually passed through the first catalytic flow-through bed, the second catalytic flow-through bed, and the third catalytic flow-through bed to provide collection of solids and/or liquids while other portions or beds of like compositions are purged with nitrogen to collect the solids and/or liquids from the beds.

In the apparatus, the first catalytic flow-through bed, the second catalytic flow-through bed, and the third catalytic flow-through bed may each be positioned between screens each of between 150 and 250 mesh. The first catalytic flow-through bed, the second catalytic flow-through bed, and the third catalytic flow-through bed may each have a porosity of a total surface area not greater than 800 $m^2/g$. The blend of natural sodium zeolite and natural calcium zeolite in the second catalytic flow-through bed may be between 25% and 75%.

In the apparatus, the exhaust stack may be adapted to exit gases from the third catalytic flow-through bed having at least 90% reduction in sulfur oxides, nitrogen oxides, and carbon oxide compared to the stack gases delivered to the first catalytic flow-through bed. Alternatively, the exhaust stack may be adapted to exit gases from the third catalytic flow-through bed having at least 95% reduction in sulfur oxides, nitrogen oxides, mercury oxide and carbon oxide compared to the stack gases delivered to the first catalytic flow-through bed.

The apparatus may further comprise at least two series of sequential first catalytic flow-through bed, second catalytic flow-through bed, and third catalytic flow-through bed provided in parallel so stack gases can be cleaned through one of the series of beds while other series of beds can be cleaned.

The apparatus may also further comprise a fourth catalytic flow-through bed of calcium zeolite provided in the exhaust stack below the first catalytic flow-through bed with a porosity of a total surface area not greater than 1200 $m^2/g$ adapted to collect bauxite compounds before passage through the first catalytic flow-through bed. The fourth catalytic flow-through bed may be provided in a rotating disk so the stack gases are continuously move there through while another portion of the disk is being purged with nitrogen. The fourth catalytic flow-through bed may have a porosity of a total surface area not greater than 800 $m^2/g$.

In the apparatus, the exhaust stack may be adapted to exit gases from the third catalytic flow-through bed with at least 95% reduction in bauxite compounds, sulfur oxides, nitrogen oxides, mercury oxides, and carbon oxide compared to the stack gases delivered to the fourth catalytic flow-through bed.

Also disclosed herein is a fertilizer product produced by the steps of:
(a) providing in a stack adapted to pass stack gases through a first catalytic flow-through bed of calcium zeolite comprising natural zeolite particles of a majority between 44 µm and 64 µm in size at a temperature above the dew point between 125 and 500° F. and a pressure between 3 and 200 psi adapted to reduce carbon oxides in the stack gases;
(b) providing in the stack adapted to pass stack gases positioned adjacent the first catalytic flow-through bed, a second catalytic flow-through bed of a blend between 25 and 75% of sodium zeolite and calcium zeolite comprising natural sodium and calcium zeolite particles of a majority between 65 µm and 125 µm in size at a temperature above the dew point between 125 and 500° F. and a pressure between 3 and 200 psi adapted to reduce nitrogen oxides in the stack gases;
(c) providing in the stack adapted to pass stack gases positioned adjacent the second catalytic flow-through bed, a third catalytic flow-through bed of calcium zeolite comprising natural zeolite particles of a majority between 78 µm and 204 µm at a temperature above the dew point between 125 and 500° F. and a pressure between 3 and 200 psi adapted to reduce sulfur oxides in the stack gases;
(d) passing stack gases selected from the group consisting of volatiles from combustion of coal or from combustion of natural gas or from a cement kiln sequential through the first catalytic bed, the second catalytic bed, and the third catalytic bed each collecting materials in the catalytic beds and providing gas exiting the third catalytic bed with at least 70% reduction in sulfur oxides, nitrogen oxides and carbon oxide; and
(e) purging solids and liquids from the first catalytic bed, the second catalytic bed, and the third catalytic bed by intermittently passing nitrogen through the beds to remove solids and liquids collected from the stack gases by the beds.

Alternatively disclosed herein is a fertilizer product produced by the steps of:
(a) providing in a stack adapted to pass stack gases of less than 7% oxygen through a first catalytic flow-through bed of calcium zeolite comprising natural zeolite particles at a temperature above the dew point between 125 and 500° F. and a pressure between 3 and 200 psi adapted to reduce carbon oxides from the stack gases and increase oxygen levels in the stack gas;
(b) providing in the stack adapted to pass stack gases positioned adjacent the first catalytic flow-through bed, a second catalytic flow-through bed of a blend between 25 and 75% of sodium zeolite and calcium zeolite comprising natural sodium and calcium zeolite particles of at a temperature above the dew point between 125 and 500° F. and a pressure between 3 and 200 psi adapted to reduce nitrogen oxides from the stack gases and increase oxygen levels in the stack gas;
(c) providing in the stack adapted to pass stack gases positioned adjacent the second catalytic flow-through bed, a third catalytic flow-through bed of calcium zeolite comprising natural zeolite particles at a temperature above the dew point between 125 and 500° F. and a pressure between 3 and 200 psi adapted to reduce sulfur oxides in the stack gases and increase oxygen levels in the stack gas; and
(d) passing stack gases of less than 7% oxygen selected from the group consisting of volatiles from combustion of coal or from combustion of natural gas or from a cement kiln sequential through the first catalytic bed, the second catalytic bed, and the third catalytic bed each collecting materials in the catalytic beds and providing gas exiting the third catalytic bed with at least 70% reduction in sulfur oxides, nitrogen oxides and carbon oxide and greater than 15% oxygen.

Also disclosed herein is a fertilizer product produced by the steps of:
(a) providing a first catalytic flow-through bed of natural calcium zeolite with a porosity of a total surface area of not greater than 1200 $m^2/g$ adapted to reduce sulfur oxides in a stack gas;
(b) providing a second catalytic flow-through bed of a blend of natural sodium zeolite and natural calcium zeolite with a porosity of a total surface area of not greater than 1200 $m^2/g$ adapted to reduce nitrogen oxides in a stack gas with the blend of sodium zeolite and calcium zeolite between 25 and 75%;
(c) providing a third catalytic flow-through bed of natural calcium zeolite with a porosity of a total surface area not greater than 1200 $m^2/g$ adapted to reduce carbon oxides and mercury oxides in a stack gas;
(d) passing stack gases selected from the group consisting of volatiles from combustion of coal or combustion of natural gas sequential through the first catalytic bed, the second catalytic bed, and the third catalytic bed each collecting solids and liquids in the catalytic beds and providing gas exiting the third catalytic bed with at least 70% reduction in sulfur oxides, nitrogen oxides, and carbon oxide; and
(e) purging the solids and liquids collected on the from the first catalytic bed, the second catalytic bed, and the third catalytic bed and collecting said solids and liquids purged from the first catalytic bed, the second catalytic bed, and the third catalytic bed to provide a fertilizer product.

In any case, the fertilizer product may be purged with gas or liquid nitrogen. The fertilizer product may be produced where the beds providing the first catalytic bed, the second catalytic bed, and the third catalytic bed are each positioned between screens of between 150 and 250 mesh. Alternatively, the fertilizer product may be produced with the stack gas pasted through a fourth catalytic flow-through bed before passage through the first catalytic bed with a porosity of a total surface area not greater than 1200 m²/g adapted to collect bauxite compounds before passage through the first catalytic bed.

In the fertilizer product, the gases exiting a stack from third catalytic bed may be at least 90% or 95% reduction in sulfur oxides, nitrogen oxides, mercury oxide and carbon oxide from the stack gases delivered to the a first catalytic flow-through bed. In the alternative, the gases exiting the third catalytic bed may be at least 90% or even 95% reduction in bauxite compounds, sulfur oxides, nitrogen oxides, mercury oxide, and carbon oxide from the stack gases where the stack gas is delivered to the beds through a fourth catalytic flow.

In the various embodiments of the method, apparatus or fertilizer product, the stack gas may include carbon monoxide (CO), carbon dioxide ($CO_2$), nitrous oxide (NOx), sulfur dioxide ($SO_2$) and nitrous dioxide ($NO_2$). The solid waste may also include nitrate salt formed by reaction of nitrogen and nitrogen compounds retained in the zeolite beds with available oxygen. And exit from the third catalytic bed will typically include excess oxygen from the reduction according in the first, second and third catalytic beds, as described above. The apparatus may also include product purged with liquid nitrogen.

In any case, the exiting stack gas with increased oxygen levels may be returned from the gas cleaning system to the burner where it is combusted with the coal or natural gas. The system may also include a solid waste draw for collecting the materials and drawing them away from the gas cleaning section.

Other details, objects and advantages of the present invention will become apparent from the description of the preferred embodiments described below in reference to the accompanying drawings.

BRIEF DESCRIPTION OF THE DRAWINGS

The following description is described of the accompanying drawings.

DETAILED DESCRIPTION OF THE DRAWINGS

Figure 1:
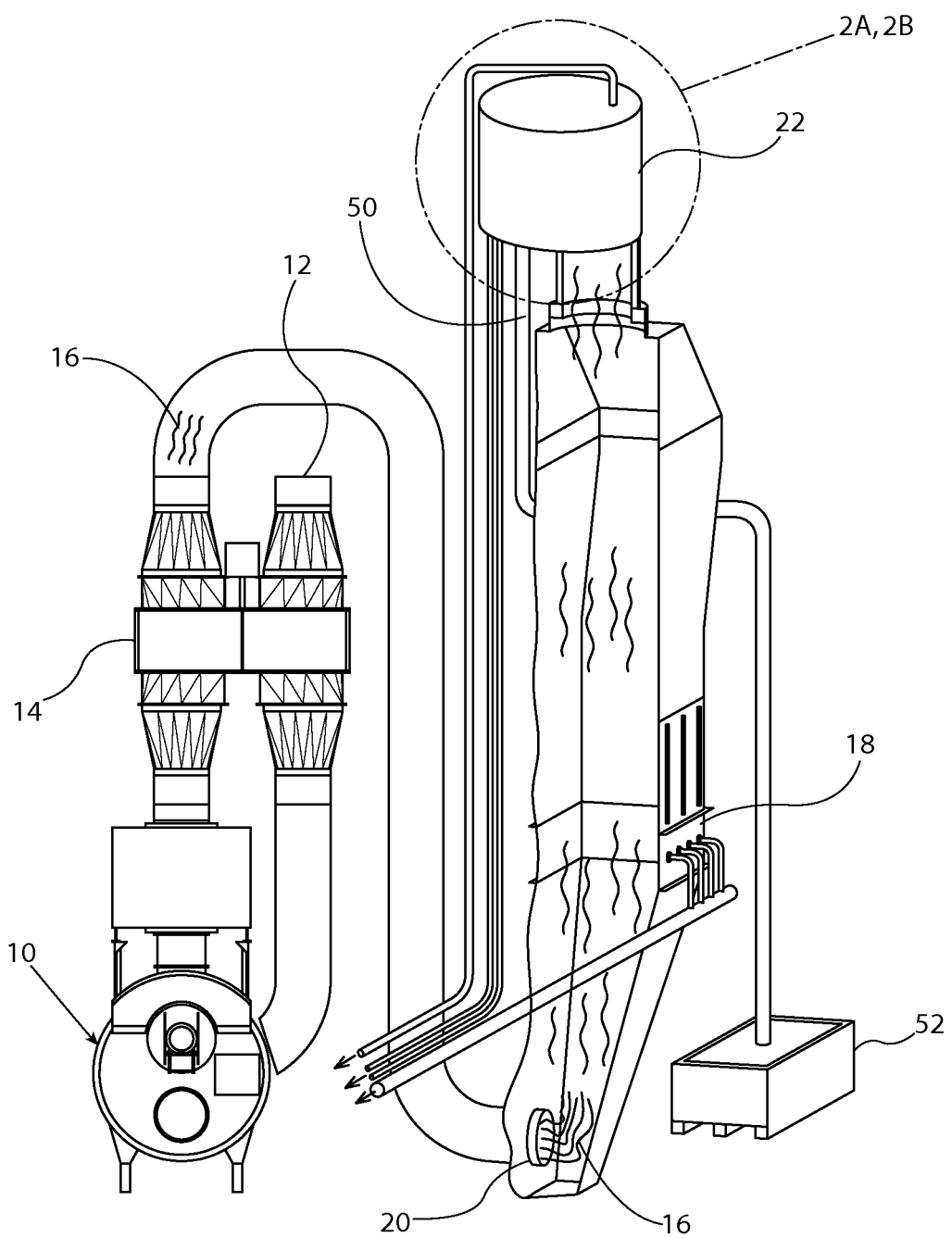
FIG. 1 is a schematic illustrating a coal-fired boiler for electric power generation using stack gases that are cleaned and solid/liquid products recovered in accordance with the present invention.

Referring to FIG. 1, schematic illustrating a coal-fired boiler for electric power generation producing stack gases that are cleaned and solid/liquid products recovered. A coal fired boiler 10 is shown utilizing the stack gas cleaning and recovery apparatus and method of the present invention. Fresh air intake 12 flows through preheater 14 to supply preheated fresh air to the boiler 10 that is coal fired. The stack gases 16 from boiler 10 pass through preheater 14 whereby heat is transferred to the fresh air intake 12.

The stack gases 16, now processed by preheater 14, are conveyed to an emission control unit where the stack gases 16 are circulated to emission control system 18 through inlet 20 and allowed to rise through the emission control system 18 and up through gas cleaning apparatus 22. The stack gases 16 at this point typically include carbon monoxide, carbon dioxide, nitrogen oxides and sulphur oxides. The stack gases 16 also include water and particulates, such as aluminum oxides, mercury compounds and other particulate matters, such as uranium and rare earth metals, as well as halogens, such as fluoride and chloride.

Figure 2A:
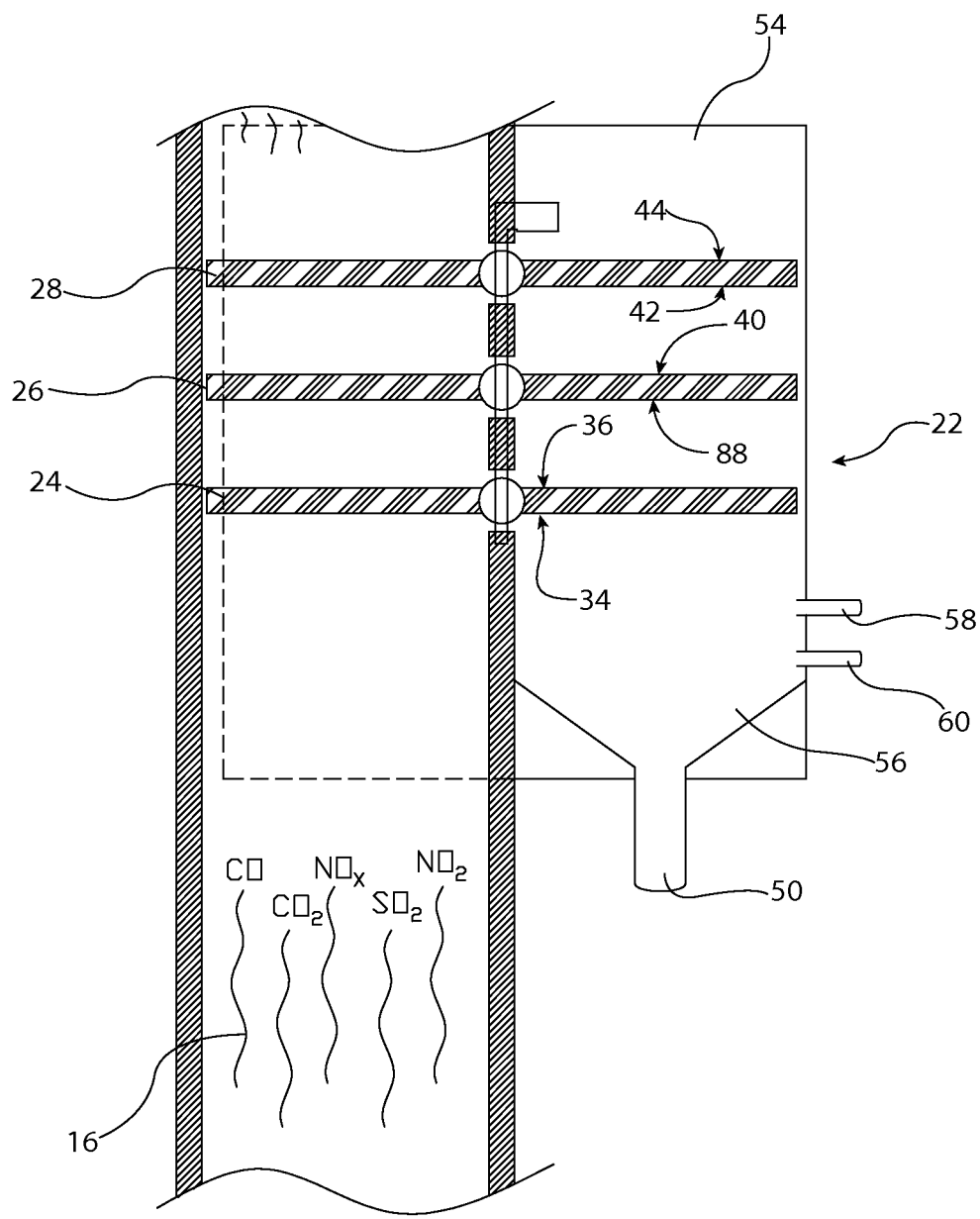
FIG. 2A is an enlarged portion of part of the stack gas cleaning and recovery system shown in FIG. 1 where three catalytic flow beds are utilized.
Figure 2B:
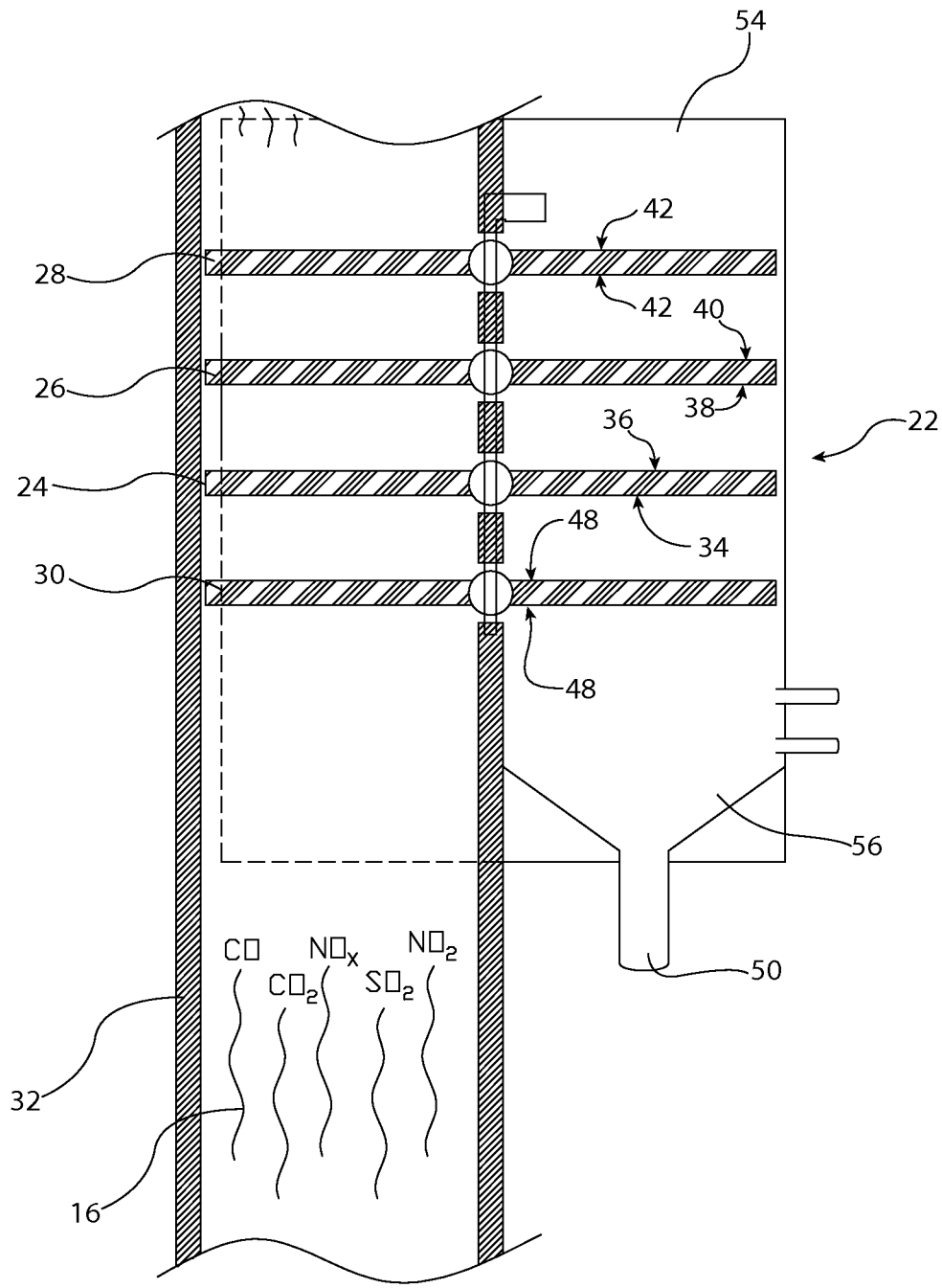
FIG. 2B is an enlarged portion of part of the stack gas cleaning and recovery shown in FIG. 1 where four catalytic beds are utilized.

With reference to FIGS. 2A-B, gas cleaning apparatus 22 may comprise first catalytic flow-through bed 24, second catalytic flow-through bed 26 and third catalytic flow-through bed 28 as shown in FIG. 2A; or gas cleaning apparatus may comprise first catalytic flow-through bed 24, second catalytic flow-through bed 26, third catalytic flow-through bed 28 and fourth catalytic flow-through bed 30 as shown in FIG. 2B. In FIG. 2A, the rising stack gases 16 in cleaning apparatus 22 first flow through the first catalytic flow-through bed 24 followed by the adjacent second catalytic flow-through bed 26, and then followed by the third catalytic flow-through bed 28. When fourth catalytic flow-through bed 30 is utilized as shown in FIG. 2B, fourth catalytic flow-through bed 30 in stack 32 in gas stack 16 ahead and adjacent the first catalytic flow-through bed 24.

First catalytic flow-through bed 24 is calcium zeolite comprised of natural zeolite particles with a majority between 44 μm and 64 μm in size. By a "majority" in the particle size range means here, as well in this application, that is highest in like particle size increments and that it necessarily is not 50% of the particle sizes in the zeolite of the bed. The calcium zeolite is a calcium-sodium-potassium aluminosilicate that is relative high calcium oxide that is available from a natural source. Typical chemical analyses of such calcium zeolite are (i) 2.85% calcium oxide (CaO), 2.85% potassium oxide ($K_2O$), 0.98% manganese oxide (MgO), 0.06% manganese oxide (MnO), 0.19% titanium dioxide ($TiO_2$), 0.05% potassium oxide ($P_2O_5$), 0.03% sodium oxide ($Na_2O$), 11.43% aluminum oxide ($Al_2O_3$), 1.26% ferric oxide ($Fe_2O_3$) 66.35% silicon dioxide ($SiO_2$) and 13.28% LOI; and (ii) 3.4% calcium oxide (CaO), 3.0% potassium oxide ($K_2O$), 1.5% manganese oxide (MgO), 0.05% potassium oxide ($P_2O_5$), 0.3% sodium oxide ($Na_2O$), 12.1% aluminum oxide ($Al_2O_3$), 1.6% ferric oxide ($Fe_2O_3$), 70.0% silicon dioxide ($SiO_2$). A source for calcium zeolite, amongst others, is St. Cloud Mining Company mines at Winston and Truth or Consequences, N. Mex. 87901, or a similar mine available in other parts of the world. By natural zeolite here and elsewhere in this description refers to that which is mined as opposed to artificial created.

The depth and breadth of the first bed 24 is determined by the flow rate of the stack gases 16 and desired pressure drop, and the physical dimensions of the stack 32 through which stack gases 16 are conveyed at the gas cleaning apparatus 22. First catalytic flow-through bed 24 is provided as a flow-through bed held in position by lower screen 34 and upper screen 36 each of between 150 and 250 mesh designed to hold the bed of calcium zeolite in position while allowing flow through of the stack gases 16.

The primary function of first catalytic flow-through bed 24 is to splitting carbon monoxide and carbon dioxide retaining the carbon in the zeolite bed. First catalytic flow-through bed 24 also captures ash and other particular matter as well as bauxite compound if the fourth catalytic flow-through bed 30 is not provided as shown in FIG. 2A.

The stack gases 16 in cleaning apparatus 22 then flow through second catalytic flow-through bed 26 positioned adjacent first catalytic flow-through bed 24. Second catalytic flow-through bed 26 is comprised of a blend between 25 and 75% of sodium zeolite and calcium zeolite with a majority of the natural sodium and calcium zeolite particles between 65 μm and 125 μm in size available from a natural source. The source of the calcium zeolite can be the same as that used to provide first catalytic flow-through bed 24, but with a majority particle size between 65 μm and 125 μm. The sodium zeolite may be natural sodium-potassium clinoptilolite that is relative high sodium oxide. Typical chemical analyses of such sodium zeolite are (i) 3.5% sodium oxide ($Na_2O$), 3.8% potassium oxide ($K_2O$), 11.9% aluminum oxide ($Al_2O_3$), 0.7% ferric oxide ($Fe_2O_3$), 0.8% calcium oxide (CaO), 0.4% manganese oxide (MgO), 0.02% manganese oxide (MnO), 0.1% titanium oxide ($TiO_2$) and 69.1% silicon dioxide ($SiO_2$), and (ii) 3.03% sodium oxide ($Na_2O$), 3.59% potassium oxide ($K_2O$), 10.27% aluminum oxide ($Al_2O_3$), 0.86% ferric oxide ($Fe_2O_3$), 1.77% calcium oxide (CaO), 0.00% potassium oxide ($K_2O$), 0.4% manganese oxide (MgO), 0.02% manganese oxide (MnO), 0.11% titanium oxide ($TiO_2$), 69.1% silicon dioxide ($SiO_2$), and 13.09% LOI. A source of the sodium zeolite, amongst others, is the St. Cloud mines in Ash Meadows, Nev., or a similar mine in other parts of the world. Again, the size and depth of the second set of the flow though bed is determined by the physical dimensions of the stack 32 and the flow rate and pressure drop through the stack 32 at the gas cleaning apparatus 22.

The primary purpose of the second flow-through bed 26 is to capture and split nitrogen oxides (NOx) in the stack gas 16. The second catalytic flow-through bed 26 is also effective in reduce water and metal compounds such as mercury, lead, uranium and other trace materials. Again, a lower screen 38 and an upper screen 40 may be provided with mesh sizes between 150 and 250 mesh to maintain the second catalytic flow-through bed 28 while allowing appropriate flow through of stack gas 16.

On exiting the second catalytic flow-through bed 26, the stack gases 16 flow through the adjacent third catalytic flow-through bed 28. The third catalytic flow-through bed is comprised of calcium zeolite similar in chemical analysis to the first catalytic flow-through bed 24 with a majority of natural zeolite particles size between 78 μm and 204.

The third catalytic flow-through bed 28 is primarily to split sulfur oxides present in the stack gas 16. The third catalytic flow-through bed may also reduce sulfur acids, calcium compounds and ash in the stack gas 16. The composition of natural calcium zeolite in third catalytic flow-through bed 28 may be of the same composition as the first catalytic flow-through bed 24, but with different zeolite particle size as described. Again, a lower screen 42 and an upper screen 44 is with mesh size between 150 and 250 mesh is provided to maintain the third catalytic flow-through bed 28.

The currently disclosed invention is operative as evidenced by substantial increase in oxygen exiting the third catalytic bed 28 compared to the oxygen levels in the stack gas entering the first catalytic bed 24. The paper by Yoshitaka Toda et al. titled "*Activation And Splitting of Carbon Dioxide on The Surface Of An Inorganic Electrode Material*" (Published 31 Jul. 2013) suggests a potential mechanism, namely, splitting off oxygen from $CO_2$ leaving CO to be then reduced. One mechanism to accomplish $CO_2$ splitting is electrophoresis disassociation of oxygen in the presence of the zeolite catalyst bed into various forms of carbon and oxygen, including oxygen radicals, such as the superoxide $O_2$-anion. Metal clusters formed in the process in the presence of the zeolite catalyst may also provide additional catalytic activity resulting in $CO_2$ splitting.

Also, the nitrogen from the stack gas is in large part retained in the zeolite beds and is available for reaction with available oxygen present particularly during purging as described below.

Where a fourth catalytic flow-through bed 30 is provided as shown in FIG. 2B, the fourth catalytic flow-through bed is provided in the stack gas 16 adjacent the first catalytic flow-through bed 24. This provides that the gas stream 16 may flow through the fourth catalytic flow-through bed 30 before flowing into the first catalytic flow-through bed 24. The composition of the fourth catalytic flow-through bed 30 is the same as the first catalytic flow-through bed, namely, comprised of calcium zeolite with a majority of the natural zeolite particles between 44 μm and 64 μm in size. The fourth catalytic flow-through bed is maintained in position by lower screen 46 and upper screen 48 with a mesh size between 150 and 250 while allowing flow of stack gas 16 though the bed. An electrical charge is also provided on the lower screen 46 to provide that the fourth catalytic flow-through bed 30 attracts and retains bauxite particles from stack gas 16. As a result, the fourth catalytic flow-through bed 30 of calcium zeolite comprising natural zeolite particles between 44 μm and 64 μm in size positioned in the stack before the first catalytic bed 24 with an electrical charge beneath said fourth catalytic flow-through bed 30 to collect bauxite compounds from the stack gases before passing through the first catalytic bed.

Where the fourth catalytic flow-through catalytic bed 30 is provided as shown in FIG. 2B, aluminum oxide may be largely separately collected and separately processed to recovered as explained below. The stack gas 16 flowing through gas cleaning apparatus 22 is separately cleaned of bauxite compounds as well, as described above, of carbon dioxide, carbon monoxide, nitrogen oxides, sulfur oxides as well as mercury oxides, water and other trace metals in the stack gas 16. The cleaning of the stack gases 16 flow through first catalytic flow-through bed 24, second catalytic flow-through bed 26, third catalytic flow-through bed 28, and if present fourth catalytic flow-through bed 30 provides at least 90%, 95%, or even 99% reduction in bauxite compounds, sulfur oxides, nitrogen oxides, mercury oxides and carbon oxides from the stack gases 16.

Figure 7A:
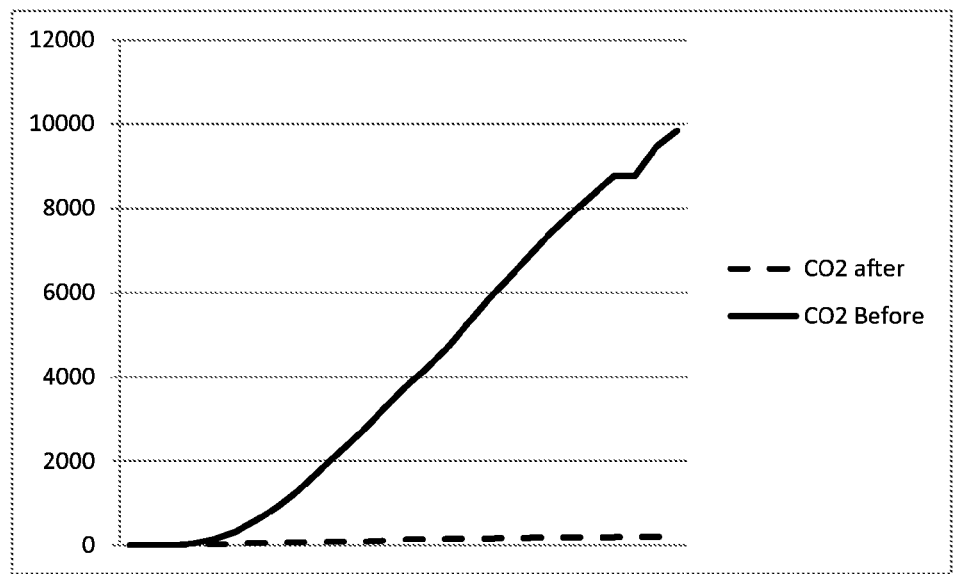
FIG. 7A is a graph illustrating $CO_2$ before and after cleaning.
Figure 7B:
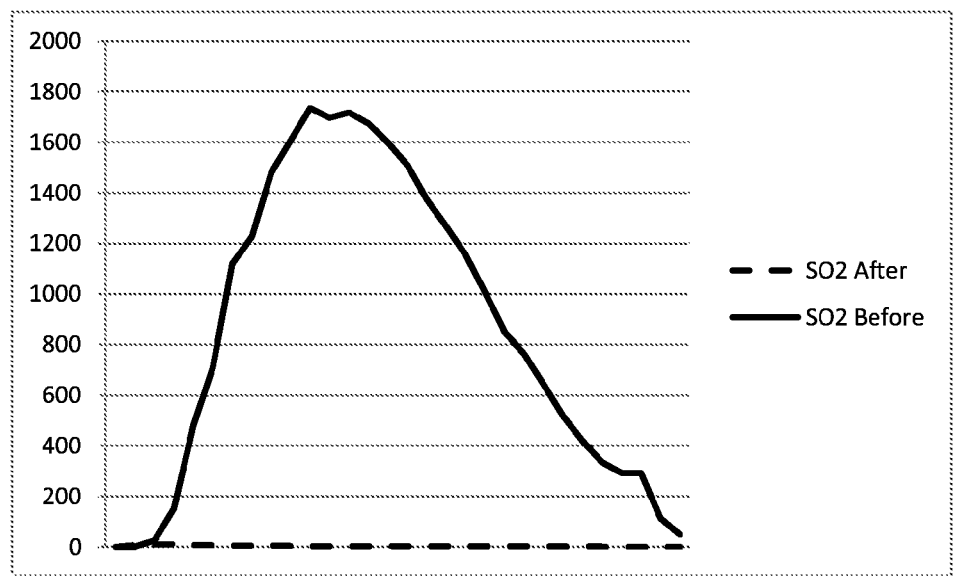
FIG. 7B is a graph illustrating $SO_2$ before and after cleaning.
Figure 7C:
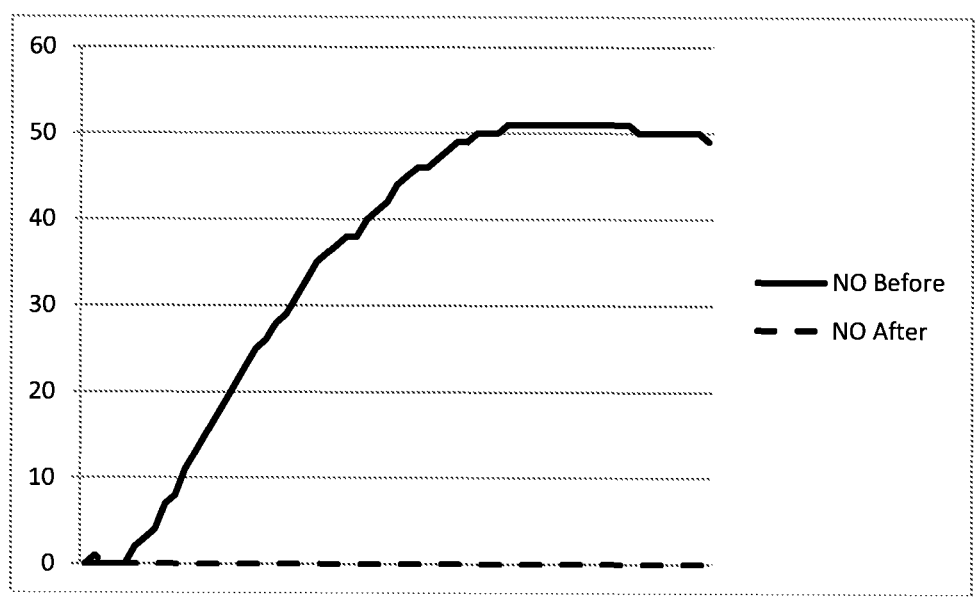
FIG. 7C is a graph illustrating NO before and after cleaning.

FIGS. 7A-7C represent data taken from a combustion gas emissions test where charcoal and 3 g of organic sulfur were combusted in a combustion oven. During a first test run, data was collected from the lower flue stack before the stack gas 16 passed through the gas cleaning apparatus 22. During a second test run, data was collected from the upper flue stack after the stack gas 16 passed through the gas cleaning apparatus. Data was collected every 5 seconds using a Testo 350XL portable combustion multi-gas analyzer. Data for the first test run (lower flue stack) was compared to and plotted with data for the second test run (upper flue stack) to provide an analysis of the results of the gas cleaning apparatus 22.

FIG. 7A illustrates measured levels of carbon dioxide ($CO_2$) (ppm) before (solid line) and after (dashed line) the stack gas 16 is cleaned by the cleaning apparatus 22.

FIG. 7B illustrates measured levels of sulfur dioxide ($SO_2$) (ppm) before (solid line) and after (dashed line) the stack gas 16 is cleaned by the cleaning apparatus 22.

FIG. 7C illustrates measured levels of nitrous oxide (NO) (ppm) before (solid line) and after (dashed line) the stack gas 16 is cleaned by the cleaning apparatus 22.

It was found by the comparison of the data that carbon dioxide in the stack gas 16 was reduced by at least 95% by the stack gas from coal-fired plant entering cleaning apparatus 22; sulfur dioxide in the stack gas 16 was reduced by at least 95% from the stack gas entering the cleaning apparatus 22; and nitrous oxide in the stack gas 16 was split and reduced by 95% or more by the stack gas entering cleaning apparatus 22. These results demonstrate the high effectiveness of the cleaning apparatus 22 in cleaning stack gas from a coal-fired power plant.

Figure 3:
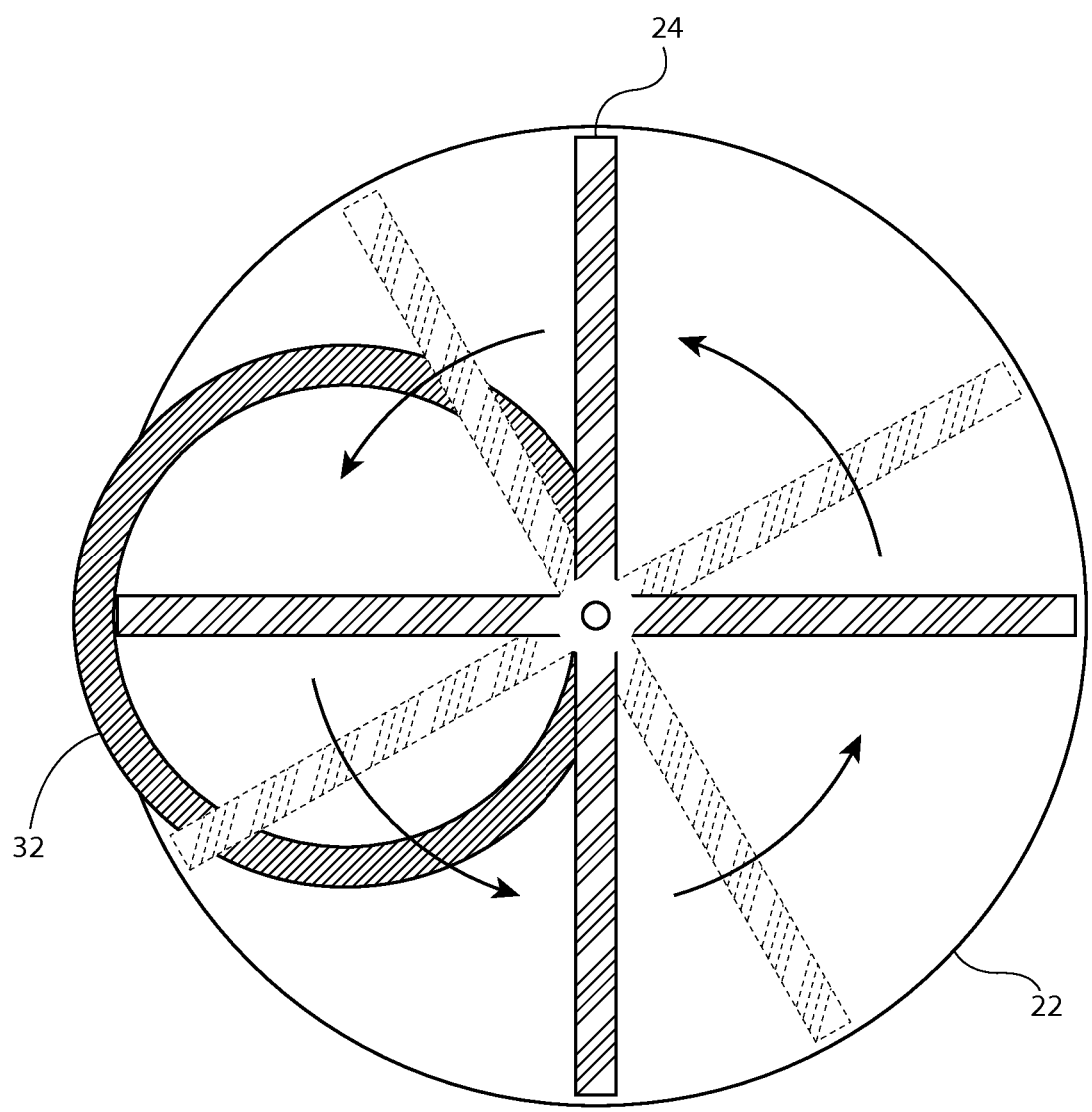
FIG. 3 is a cross-section taken along line 3-3 of FIG. 2A or FIG. 2B.

While the cleaning apparatus is in operation, material including carbon, sulfur, nitrogen, and other products are collected by the catalytic through-flow beds. Intermittently, as appropriate, the first catalytic through-flow bed 24, second catalytic through-flow bed 26, third catalytic through-flow bed 28 and fourth catalytic through-flow bed 30 (where present) may be switched between parallel systems as shown in FIGS. 2 and 3. The stack gases 16 may, thus, continuing to flow through stack 32 and be cleaned in stack cleaning apparatus 22 while the parallel first catalytic through-flow bed 24, second catalytic through-flow bed 26, third catalytic through-flow bed 28 and fourth catalytic through-flow bed 30 (where present) are rotated off line and purged with nitrogen to remove material from the catalytic beds. This purging of the beds may be done with cryogenic nitrogen or nitrogen gas, or other suitable liquid or gas, generally referred to as a purge fluid.

During the purging process, purge fluid is released from a reservoir 54 and the purging fluid passes through one or more of the first catalytic through-flow bed 24, second catalytic through-flow bed 26, third catalytic through-flow bed 28 and fourth catalytic through-flow bed 30 (where present). The purge fluid may be pressurized or may fall by gravity through one or more of the catalytic through-flow beds, releasing material from the catalytic through-flow beds.

This purging produces a solid waste largely of nitrate composition that is discharged through outlet 50 into a container 52. The nitrate compounds can be formed by reaction of the nitrogen and nitrogen compounds retained by the zeolite beds with the oxygen present during purging. The mechanism of formation of these nitrate fertilizer materials may involve catalytic splitting of the nitrogen compounds present in the stack gas stream into nitrogen retained in the zeolite beds and/or the nitrogen compounds retained in the zeolite beds, which are then available to react with free oxygen atoms and/or oxygen radicals in purging to form nitrate powders. Because large amounts of nitrogen are present in the stack gas stream, relatively large amounts of nitrate compounds may be present in the fertilizers produced. These nitrate fertilizers provide a value byproduct of the present process.

If a fourth catalytic through-flow bed 30 is provided, that bed may be separately purged through a separate outlet into a separate container (not shown) to allow for recovery of bauxite compounds as a separate product. Where a fourth catalytic bed is not provided, the bauxite compounds are collected in the first catalytic through-flow bed 24 and provided as a part of a fertilizer composition and product. Metals such as mercury, zinc, lead and other trace metals are also collected as part of the fertilizer product that is recovered.

The purging may also produce gases, such as oxygen ($O_2$) and nitrogen ($N_2$) that may be extracted by a first gas outlet 58 that transports a portion of the gases (e.g. $N_2$) to a recycler and a second gas outlet 60 that transports a portion of the gases (e.g. $O_2$) to the burner for combusting the fuel.

Figure 4:
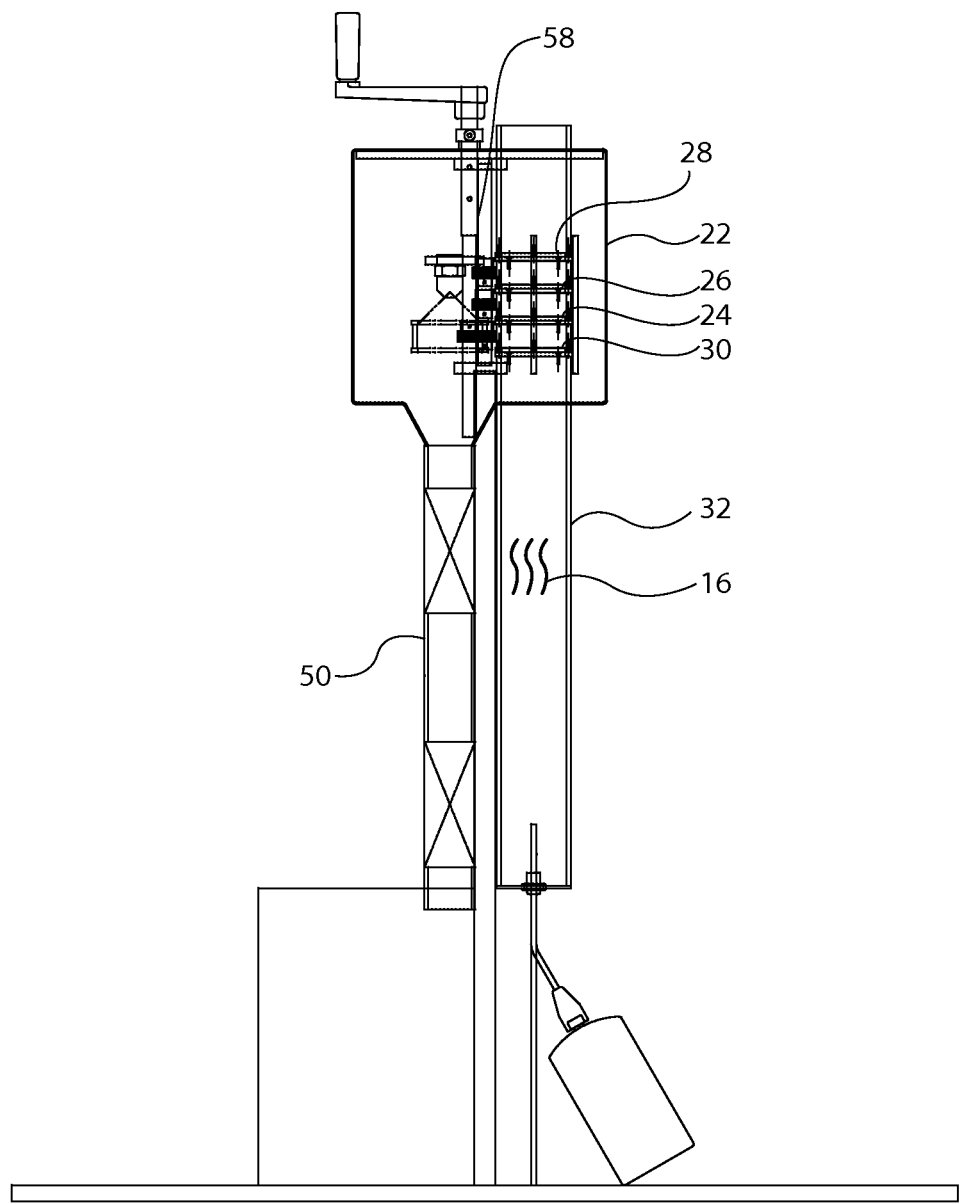
FIG. 4 is a schematic illustrating a test facility designed to test the cleaning of stack gases and recovery of solids and liquids with the invention.
Figure 5:
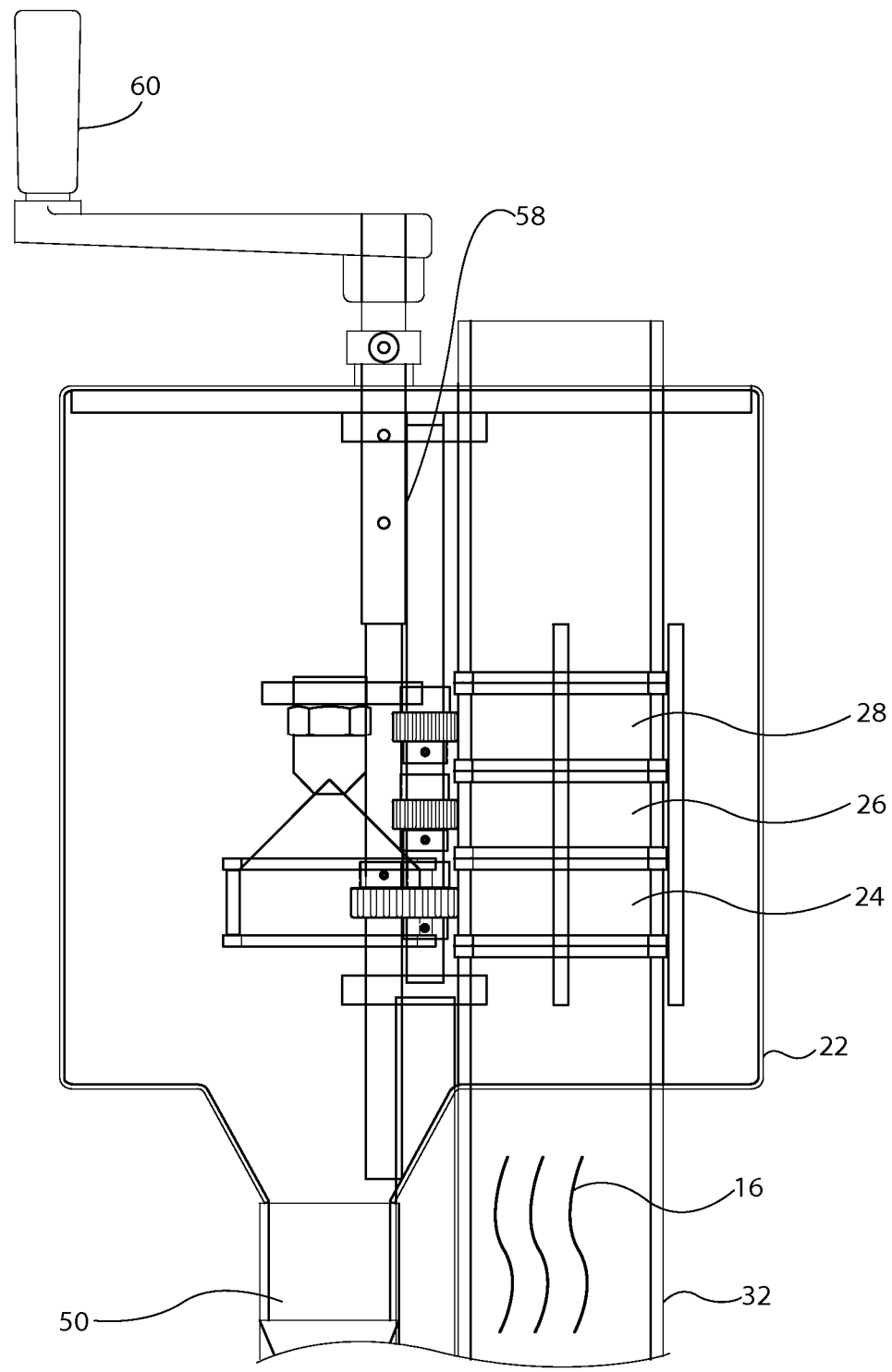
FIG. 5 is an enlarged portion of the test facility shown in FIG. 4.

A test apparatus is illustrated in FIGS. 4-5. The testing apparatus includes a stack 32 for transporting stack gas 16 to the gas cleaning apparatus 22 described above. The gas cleaning apparatus 22 is shown in further detail in FIG. 5 and includes first 24, second 26 and third 28 catalytic through-flow beds each having a zeolite composition as described above. Each of the catalytic through-flow beds may be connected to a central drive shaft 58 that is adapted to rotate or otherwise move each of the catalytic through-flow beds, individually, from a first position where stack gas 16 passes through the bed to a second position where the catalytic through-flow bed is purged by the purge fluid. A handle 60 is provided that may be translated vertically to select one of the catalytic through-flow beds and rotated or otherwise move the selected through-flow bed from the first position to the second position.

Figure 6:
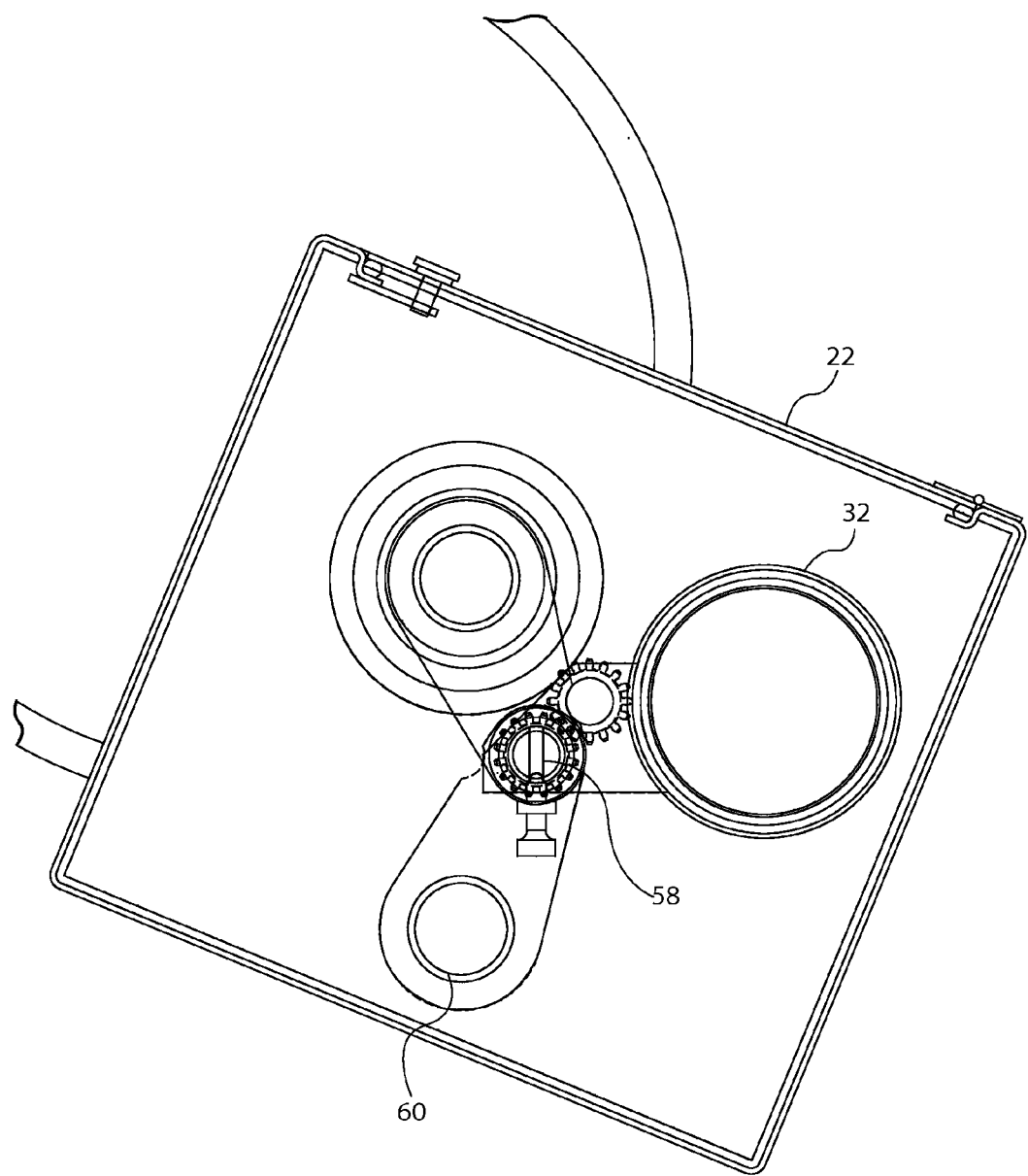
FIG. 6 is an illustration corresponding to FIG. 5 in top view showing the movement of catalytic flow through three catalytic beds in FIG. 5.

FIG. 6 is a top view of the cleaning apparatus 22 according to the testing apparatus shown in FIGS. 4-5. In this view, the catalytic through-flow beds are aligned with the coal stack 32.

The tests with the test facility shown in FIGS. 4-6 included Kentucky coal-fired by propane, Ohio coal fired and two tests with charcoal mixed with organic sulfur. The samples were fired by a propane burner at 62 shown in FIG. 4 or in a combustion oven (not shown) before positioning below stack 32. These illustrate the operation of the method and apparatus. The data from these tests is set forth in table and graphic form in the Appendix A to this application.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. Apparatus for cleaning stack gases comprising:
   (a) a first catalytic flow-through bed of natural calcium zeolite with a porosity of a total surface area of not greater than 1200 $m^2/g$ adapted to reduce sulfur oxides positioned in an exhaust stack;
   (b) a second catalytic flow-through bed of a blend of natural sodium zeolite and natural calcium zeolite of a porosity with a total surface area of not greater than 1200 $m^2/g$ adapted to reduce nitrogen oxides positioned in the exhaust stack above the first bed;
   (c) a third catalytic flow-through bed of natural calcium zeolite with a porosity of a total surface area not greater than 1200 $m^2/g$ adapted to reduce carbon oxides and mercury oxides positioned in the exhaust stack above the second bed;
   (d) the exhaust stack adapted to provide a gas flow selected from the group consisting of volatiles from combustion of coal or combustion of natural gas or from a cement kiln sequential through the first catalytic flow-through bed, the second catalytic flow-through bed, and the third catalytic flow-through bed each catalytic bed collecting solids and providing stack gases exiting the third catalytic flow-through bed with at least 70% reduction in sulfur oxides, nitrogen oxides, and carbon oxide; and (e) the first catalytic flow-through bed, the second catalytic flow-through bed, and the third catalytic flow-through bed are each provided on rotating disks such that the stack gases can be continually passed through the first catalytic flow-through bed, the second catalytic flow-through bed, and the third catalytic flow-through bed to provide collection of solids and/or liquids while other portions or beds of like compositions are purged with nitrogen to collect the solids and/or liquids from the beds.

2. The apparatus as set forth in claim 1 where the first catalytic flow-through bed, the second catalytic flow-through bed, and the third catalytic flow-through bed are each positioned between screens each of between 150 and 250 mesh.

3. The apparatus as set forth in claim 1 where the blend of natural sodium zeolite and natural calcium zeolite in the second catalytic flow-through bed is between 25% and 75%.

4. The apparatus as set forth in claim 1 where the exhaust stack is adapted to exit gases from the third catalytic flow-through bed having at least 90% reduction in sulfur oxides, nitrogen oxides, and carbon oxide compared to the stack gases delivered to the first catalytic flow-through bed.

5. The apparatus as set forth in claim 1 where the exhaust stack is adapted to exit gases from the third catalytic flow-through bed having at least 95% reduction in sulfur oxides, nitrogen oxides, mercury oxide and carbon oxide compared to the stack gases delivered to the first catalytic flow-through bed.

6. The apparatus as set forth in claim 1 where the first catalytic flow-through bed, the second catalytic flow-through bed, and the third catalytic flow-through bed each have a porosity of a total surface area not greater than 800 $m^2/g$.

7. The apparatus as set forth in claim 1 further comprising at least two series of sequential first catalytic flow-through bed, second catalytic flow-through bed, and third catalytic flow-through bed provided in parallel so stack gases can be cleaned through one of the series of beds while other series of beds can be cleaned.

8. The apparatus as set forth in claim 1 where a fourth catalytic flow-through bed of calcium zeolite is provided in the exhaust stack below the first catalytic flow-through bed with a porosity of a total surface area not greater than 1200 $m^2/g$ adapted to collect bauxite compounds before passage through the first catalytic flow-through bed.

9. The apparatus as set forth in claim 8 where the fourth catalytic flow-through bed is provided in a rotating disk so the stack gases are continuously move there through while another portion of the disk is being purged with nitrogen.

10. The apparatus as set forth in claim 8 where the fourth catalytic flow-through bed has a porosity of a total surface area not greater than 800 $m^2/g$.

11. The apparatus as set forth in claim 8 where the exhaust stack is adapted to exit gases from the third catalytic flow-through bed with at least 95% reduction in bauxite compounds, sulfur oxides, nitrogen oxides, mercury oxides, and carbon oxide compared to the stack gases delivered to the fourth catalytic flow-through bed.

* * * * *

UNITED STATES PATENT AND TRADEMARK OFFICE
CERTIFICATE OF CORRECTION

PATENT NO. : 9,737,849 B2  
APPLICATION NO. : 14/722244  
DATED : August 22, 2017  
INVENTOR(S) : James Gary Davidson Page 1 of 1

It is certified that error appears in the above-identified patent and that said Letters Patent is hereby corrected as shown below:

In Column 2, Line 58, delete "78 m and 204 m" and substitute therefor --78 µm and 204 µm--.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*